(12) United States Patent
Han

(10) Patent No.: US 12,500,992 B2
(45) Date of Patent: Dec. 16, 2025

(54) SYSTEMS AND METHODS FOR AUTOMATIC MULTI-DANCE TRANSITION

(71) Applicant: Kingstar Technologies, Inc., San Diego, CA (US)

(72) Inventor: Hee-Chul Han, San Diego, CA (US)

(73) Assignee: Kingstar Technologies, Inc.

( * ) Notice: Subject to any disclaimer, the term of this patent is extended or adjusted under 35 U.S.C. 154(b) by 569 days.

(21) Appl. No.: 17/943,150

(22) Filed: Sep. 12, 2022

(65) Prior Publication Data

US 2024/0089401 A1  Mar. 14, 2024

(51) Int. Cl.
| | | |
|---|---|---|
| *H04N 5/265* | (2006.01) | |
| *G06T 5/50* | (2006.01) | |
| *G06T 7/73* | (2017.01) | |
| *H04N 5/272* | (2006.01) | |

(52) U.S. Cl.
CPC ............ *H04N 5/265* (2013.01); *G06T 5/50* (2013.01); *G06T 7/74* (2017.01); *G06T 2207/10016* (2013.01); *G06T 2207/20221* (2013.01); *H04N 2005/2726* (2013.01)

(58) Field of Classification Search
CPC .. H04N 5/265; H04N 2005/2726; G06T 5/50; G06T 7/74; G06T 2207/10016; G06T 2207/20221; G11B 27/038; G11B 27/28
See application file for complete search history.

(56) References Cited

U.S. PATENT DOCUMENTS

| | | | |
|---|---|---|---|
| 9,635,307 B1* | 4/2017 | Mysore Vijaya Kumar ................ | G06T 7/90 |
| 2012/0021833 A1* | 1/2012 | Boch ..................... | A63F 13/814 463/36 |
| 2018/0295396 A1* | 10/2018 | Ramadorai ........ | H04N 21/2743 |
| 2020/0023157 A1* | 1/2020 | Lewis .................... | A61B 5/369 |
| 2022/0148247 A1* | 5/2022 | Bashkirov ............... | G06T 7/174 |

FOREIGN PATENT DOCUMENTS

CN  114302174 A  *  4/2022

OTHER PUBLICATIONS

Chan, Caroline, Shiry Ginosar, Tinghui Zhou, and Alexei A. Efros. "Everybody dance now." In Proceedings of the IEEE/CVF international conference on computer vision, pp. 5933-5942. 2019.*

(Continued)

*Primary Examiner* — Samir A Ahmed
(74) *Attorney, Agent, or Firm* — IPX PLLC

(57) ABSTRACT

Video processing systems and methods are disclosed. An exemplary video processing method includes receiving a first performance video and a second performance video, and estimating, by at least one processor, pose information in each of the first performance video and the second performance video. The video processing method further includes determining, by the at least one processor, a point of transition from the first performance video to the second performance video based on a pose distance calculated using the estimated pose information; and generating, by the at least one processor, a third performance video by transitioning the first performance video to the second performance video at the point of transition.

18 Claims, 15 Drawing Sheets

(56) References Cited

OTHER PUBLICATIONS

Guo X, Zhao Y, Li J. DanceIt: music-inspired dancing video synthesis. IEEE Transactions on Image Processing. Jun. 8, 2021;30:5559-72.*

Fan, Rukun, Songhua Xu, and Weidong Geng. "Example-based automatic music-driven conventional dance motion synthesis." IEEE transactions on visualization and computer graphics 18, No. 3 (2011): 501-515.*

* cited by examiner

SYSTEMS AND METHODS FOR AUTOMATIC MULTI-DANCE TRANSITION

TECHNICAL FIELD

The present disclosure relates to systems and methods for performance video editing for smooth transition, and more particularly, to systems and methods for automatic transition of performance (e.g., dance) videos using a multi composition method.

BACKGROUND

There are 50 million people in the video creator economy today thanks to video sharing platforms like YouTube™. Video is prolific and has the power to teach, influence, and inspire audiences everywhere. For example, dance cover is a video clip uploaded on a video-sharing service in which dancers re-enact the choreography of an original music video or, one's own choreography that's different from the original. The K-pop choreography has sparked a subculture of fans learning the dances and sharing their covers on the internet. Cover dancers replicate the choreography with attention to detail, lip-sync the Korean lyrics and sport elaborate customized costumes.

In today's video sharing world, the tools used to capture video such as smartphones are accessible to everyone. The biggest challenges begin the moment after one stops recording. Video editing remains inefficient. To generate more creative video such as the overlap effect in dance covers, manually organizing, reviewing, and logging what one sees and hears can be a time-consuming and draining process. As a result, video creators can easily spend days, weeks, or months organizing footages.

The present disclosure provides systems and methods to improve the generation of a transition video with overlap effect edited from multiple performance videos.

SUMMARY

Embodiments of the disclosure improve the existing video editing systems and methods by using a novel multi composition algorithm and various automated techniques for generating a transition video from multiple performance videos.

In one aspect, a video processing method is disclosed. The method includes receiving a first performance video and a second performance video. The method further includes estimating, by at least one processor, pose information in each of the first performance video and second performance video. The method also includes determining, by the at least one processor, a point of transition from the first performance video to the second performance video based on a pose distance calculated using the estimated pose information. The method additionally includes generating, by the at least one processor, a third performance video by transitioning the first performance video to the second performance video at the point of transition.

In another aspect, a video processing system is disclosed. An exemplary system includes a storage device configured to receive a first performance video and a second performance video. The system further includes at least one processor configured to estimate pose information in each of the first performance video and second performance video; determine a point of transition from the first performance video to the second performance video based on a pose distance calculated using the estimated pose information; and generate a third performance video by transitioning the first performance video to the second performance video at the point of transition.

In yet another aspect, a non-transitory computer-readable medium having stored thereon a computer program is disclosed. The computer program, when executed by at least one processor, causes the at least one processor to perform a video processing method. The video processing method includes receiving a first performance video and a second performance video. The method further includes estimating pose information in each of the first performance video and second performance video. The method also includes determining a point of transition from the first performance video to the second performance video based on a pose distance calculated using the estimated pose information. The method additionally includes generating a third performance video by transitioning the first performance video to the second performance video at the point of transition.

It is to be understood that both the foregoing general description and the following detailed description are exemplary and explanatory only and are not restrictive of the invention, as claimed.

DETAILED DESCRIPTION

Reference will now be made in detail to the exemplary embodiments, examples of which are illustrated in the accompanying drawings. Wherever possible, the same reference numbers will be used throughout the drawings to refer to the same or like parts.

Figure 1:
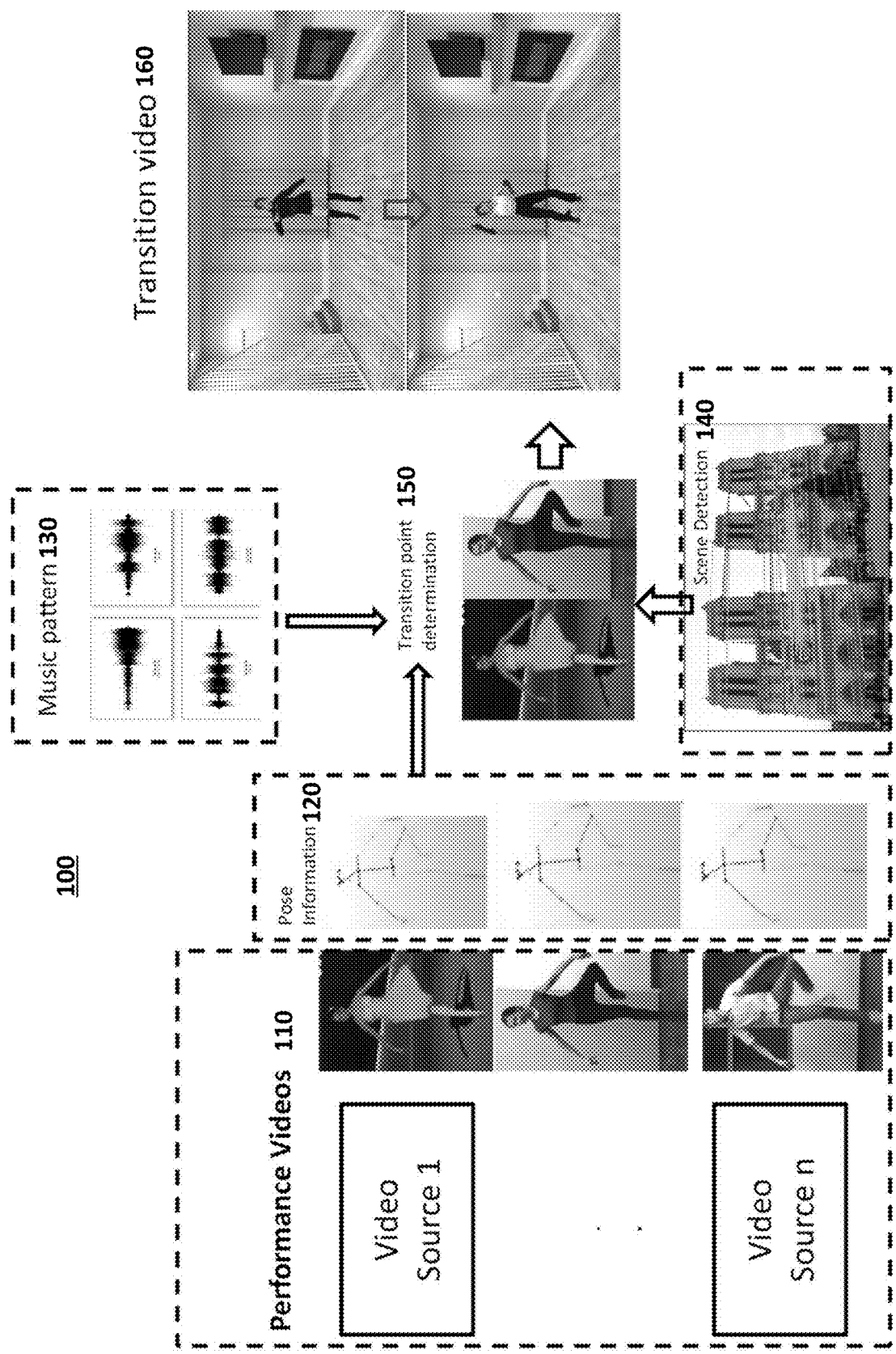
FIG. 1 is a schematic diagram illustrating a framework of a multi composition method, according to embodiments of the disclosure.

FIG. 1 is a schematic diagram illustrating a framework of a multi composition method 100, according to embodiments of the disclosure. In some embodiments, multi composition method 100 may be applied to make automatic smooth transition between or among multiple performance videos. For example, multi composition method 100 can be used to make a dance cover with a smooth transition. A dance cover is a video clip uploaded on a video-sharing service in which dancers re-enact the choreography of an original music video or, one's own choreography that's different from the original. A person who takes videos for dance cover usually takes many videos with different costumes and then edits the videos to combine them into one dance cover video that shows the dancer smoothly transitioning between or among the different costumes. Because it takes a lot of time to practice dance cover, one would want to show the transition seamlessly.

Figure 2:
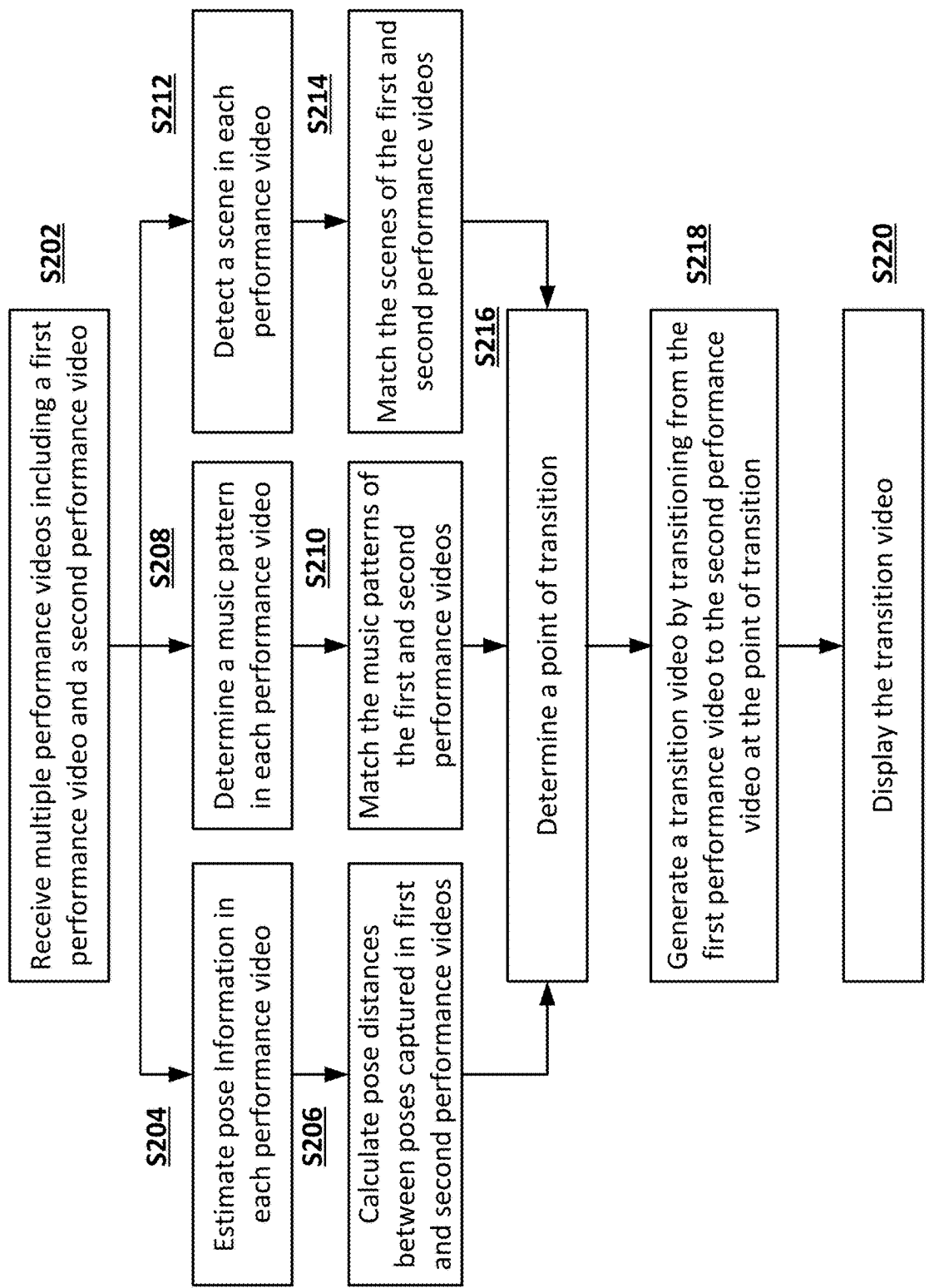
FIG. 2 is a flowchart of an exemplary method for generating a transition video from multiple performance videos, according to embodiments of the disclosure.

FIG. 2 is a flowchart of an exemplary method 200 for generating a transition video from multiple performance videos, according to embodiments of the disclosure. Method 200 may include steps S202-S220 as described below. It is to be appreciated that some of the steps may be optional to perform the disclosure provided herein. Further, some of the steps may be performed simultaneously, or in a different order than shown in FIG. 2. In some embodiments, the framework of multi composition method 100 may be adopted to implement method 200. Therefore, FIG. 1 and FIG. 2 are described together.

In step S202, multiple performance videos are received. For example, as shown in FIG. 1, multi composition method 100 may receive multiple performance videos 110 from multiple sources, such as video source 1 to video source n. For example, performance videos 110 may be taken of the same performer (or performers) giving the same performance at different times/locations, with different costumes/clothes. In other examples, performance videos 110 may be taken of different performers giving the same performance. For example, the same dance or different dancers may perform the same dance with same or different choreographies. Performance videos 110 may be captured by a same video camera or different video cameras. As shown in FIG. 1, performance videos 110 may include dance videos capturing three dancers performing the same ballet dance. For the purpose of description, method 200 will be described in the context of a first performance video and a second performance video included in the multiple performance videos. It is contemplated that the first performance video and the second performance video can be any two different performance videos selected among the multiple performance videos received.

Each performance video 110 may include multimedia data that captures the performance through different media channels. For example, the multimedia data may include image data that captures the movement of the performer and the static scene behind the performer. The image data is stored as a time sequence of image frames. The multimedia data may further include audio data that captures the soundtrack accompanying the performance, such as the dance music (if the performance is a dance) or the singing music and lyrics (if the performance is singing). The image data and audio data may be captured by different devices, such as the camera and microphone of the video camera and compressed for storage or transmission. The image data and audio data of the same video are temporally linked by, e.g., time stamps, such that when they are played, the graphics and the soundtracks are synchronized to reproduce the performance.

In step S204, pose information may be estimated from each performance video. For example, as shown FIG. 1, multi composition method 100 may estimate pose information 120 from the image data of each performance video 110. Pose estimation is the task that estimates the pose of a person from an image or a video by estimating the spatial locations of key body joints (also known as keypoints) In some implementations, artificial intelligence techniques, such as machine learning models, may be applied to estimate pose information 120.

Figure 3:
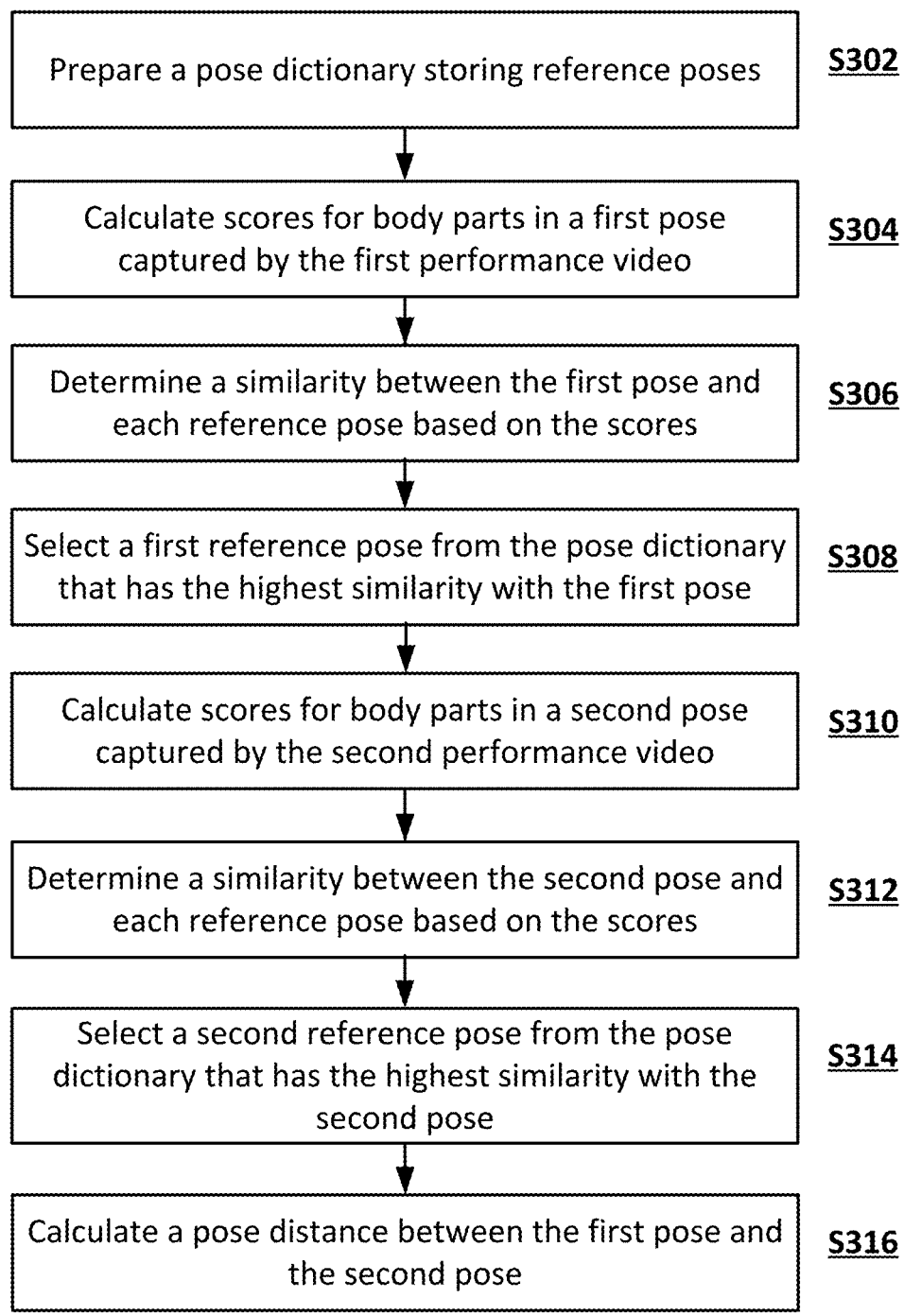
FIG. 3 is a flowchart of an exemplary method for calculating a pose distance, according to embodiments of the disclosure.

In step S206, pose distances are calculated between poses captured in the first and second performance videos. A pose distance measures the similarity/difference between two poses. In some embodiments, a pose library-based approach may be used to calculate the pose distances, such as illustrated in FIG. 3. FIG. 3 is a flowchart of an exemplary method 300 for calculating a pose distance, according to embodiments of the disclosure. Method 300 may include steps S302-S316 as described below. It is to be appreciated that some of the steps may be optional to perform the disclosure provided herein. Further, some of the steps may be performed simultaneously, or in a different order than shown in FIG. 3. In some embodiments, method 300 may be implemented to perform step S206 of method 200 for calculating the pose distances.

Figure 4:
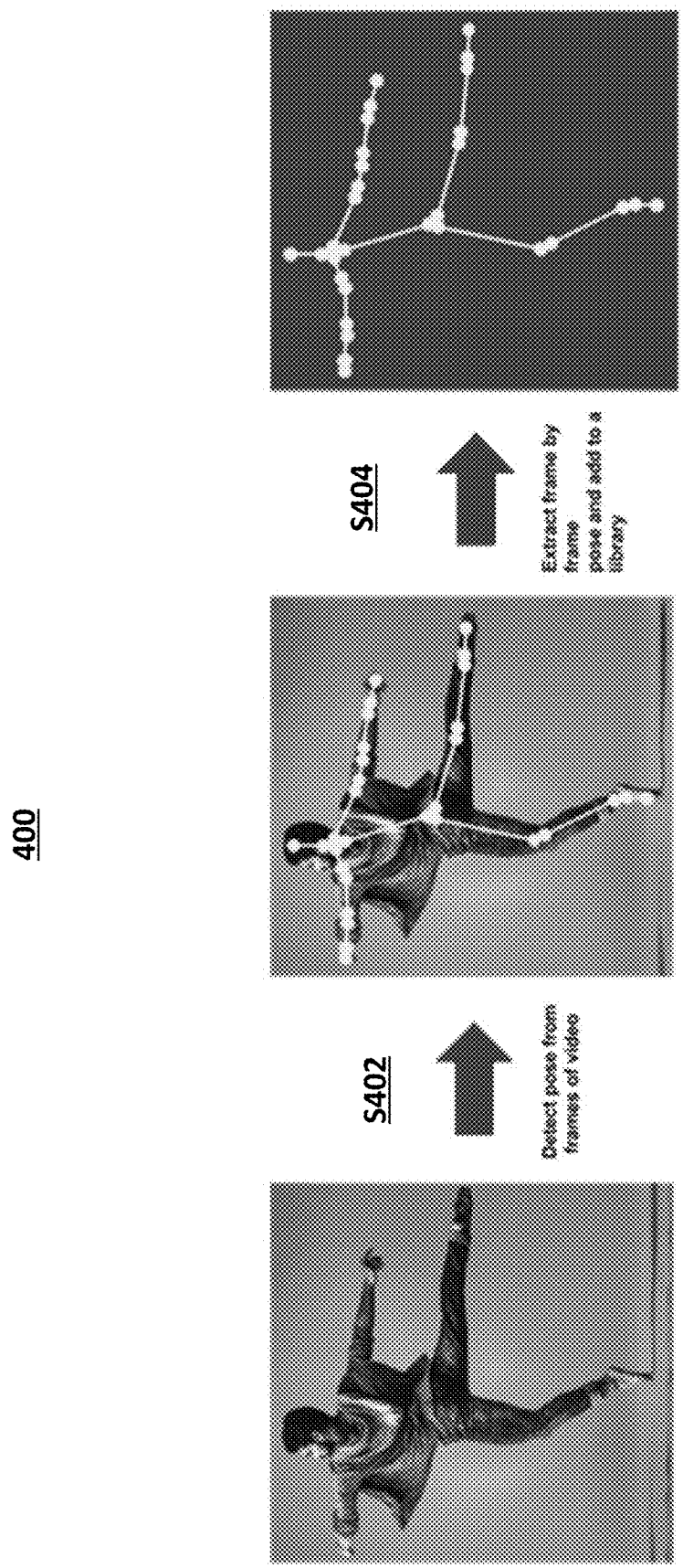
FIG. 4 illustrates an exemplary process for constructing a pose library, according to embodiments of the disclosure.

In step S302, a pose dictionary storing reference poses may be prepared. For example, FIG. 4 illustrates an exemplary process 400 for constructing a pose library, according to embodiments of the disclosure. Reference poses may be extracted and reconstructed from sample image frames of various videos. As shown in FIG. 4, an image frame of a video capturing a pose of a dancer is used. In step S402, the pose is detected from the image frame. The pose can be represented by keypoints corresponding to key body joints and lines connecting those keypoints. In step S404, the pose is extracted from the frame and added to the pose library as a reference pose. Process 400 may be repeated for multiple frames to extract multiple reference poses. A pose library including various reference poses can thus be constructed.

Figure 5:
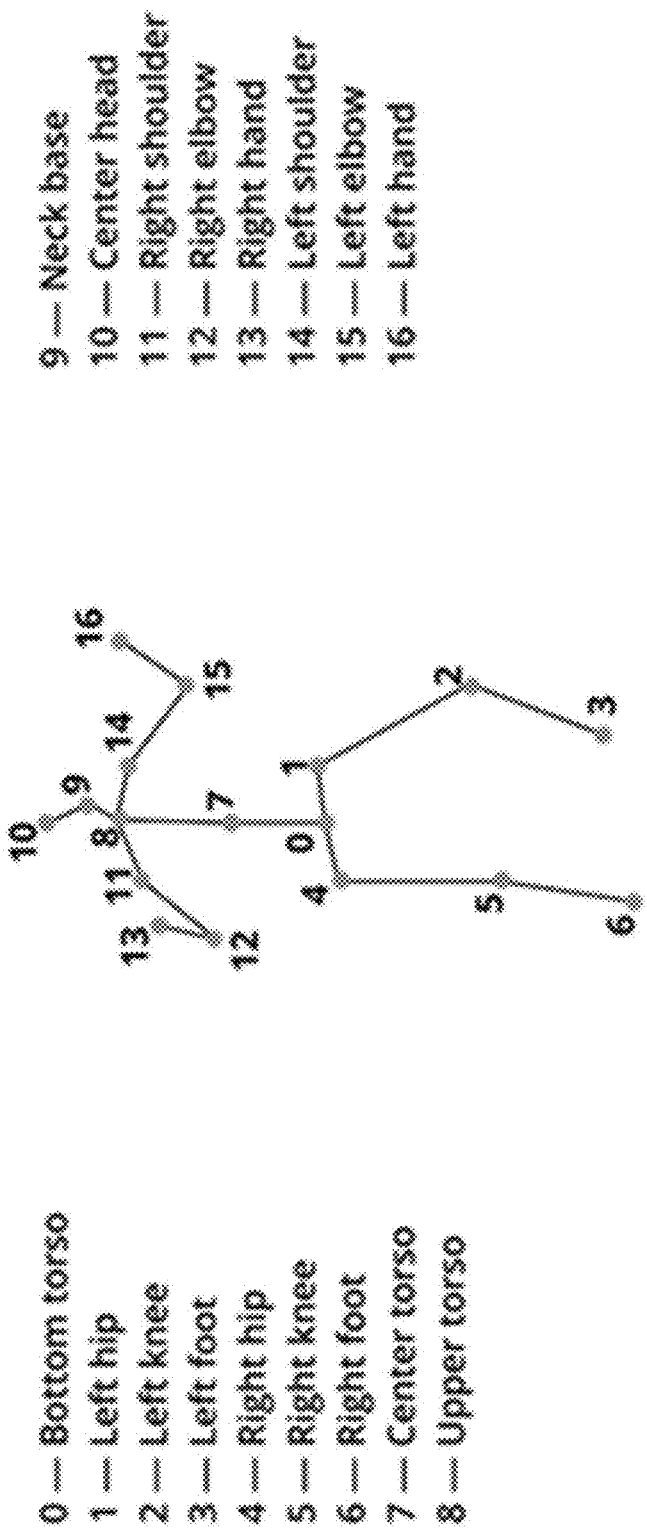
FIG. 5 illustrates exemplary body parts for estimating pose information, according to embodiments of the disclosure.

Returning to FIG. 3, in S304, scores for various body parts in a first pose captured by the first performance video are calculated against those body parts in the reference poses in the pose library. For example, FIG. 5 illustrates exemplary body parts for estimating pose information, according to embodiments of the disclosure. The body parts are defined by three-dimensional (3D) keypoints representing the body joints. For example, as shown in FIG. 5, keypoint 0 represents the bottom torso, keypoint 1 represents the left hip, keypoint 2 represents the left knee, and keypoint 3 represents the left foot, and the lines connecting these keypoints define the left leg of the person. As another example, keypoint 8 represents the upper torso, keypoint 14 represents the left shoulder, keypoint 15 represents the left elbow, and keypoint 16 represents the left hand, so the lines connecting keypoints 8, 14, 15, and 16 define the left arm of the person. A score may be calculated for each body part in the pose as opposed to the corresponding body part of each reference pose in the pose library. In some embodiments, the score may be the variance or mean of distance for each body part.

Returning to FIG. 3, in step S306, a similarity is determined between the first pose and each reference pose based on the scores calculated in step S304. In some embodiments, the similarity may be calculated as the sum, the average, or a weighted average of the scores of the various body parts in the first pose. The similarity measures how well the first pose resembles each reference pose in the pose library.

In step S308, a reference pose in the pose dictionary that has the highest similarity with the first pose is selected as the first reference pose.

In steps S310-S312, similar calculations carried out in steps S304-S306 for the first pose can be repeated for the second pose captured by the second performance video. As a result, in step S314, a reference pose in the pose dictionary that has the highest similarity with the second pose is selected as the second reference pose.

In step S316, the pose distance between the first pose and the second pose is determined. Consistent with the present disclosure, the pre-calculated distance between the first reference pose and the second reference pose can be used as the pose distance. The distances between every two reference poses in the pose dictionary may be pre-calculated and stored as part of the pose library. Because the first reference pose is most similar to the first pose captured by the first performance video and the second reference pose is most similar to the second pose captured by the second performance video, the pose distance between the two poses of the two performance videos can be well approximated by the pre-calculated pose distance between the two reference poses.

Returning to FIG. 2, in some embodiments, other analysis may also be performed using the estimated pose information as part of step S206. For example, time stamps can be made with the pose estimation. If the dance has A pose→B pose→A pose→C pose, the pose information can be compared as a time sequence of poses according to the time stamps.

In some embodiments, in step S208, a music pattern is determined for each performance video. For example, as shown in FIG. 1, multi composition method 100 may determine music pattern 130 from the audio data of each performance video 110. Music pattern plays a central role in musical analysis and creation. Musical patterns may exist at any level of a composition, from transitory surface phenomena to deep structural organization. A pattern may be defined for a single sound attribute such as frequency, or it may relate multiple sound attributes (such as frequency, rhythm, and amplitude) in parallel.

Figure 6:
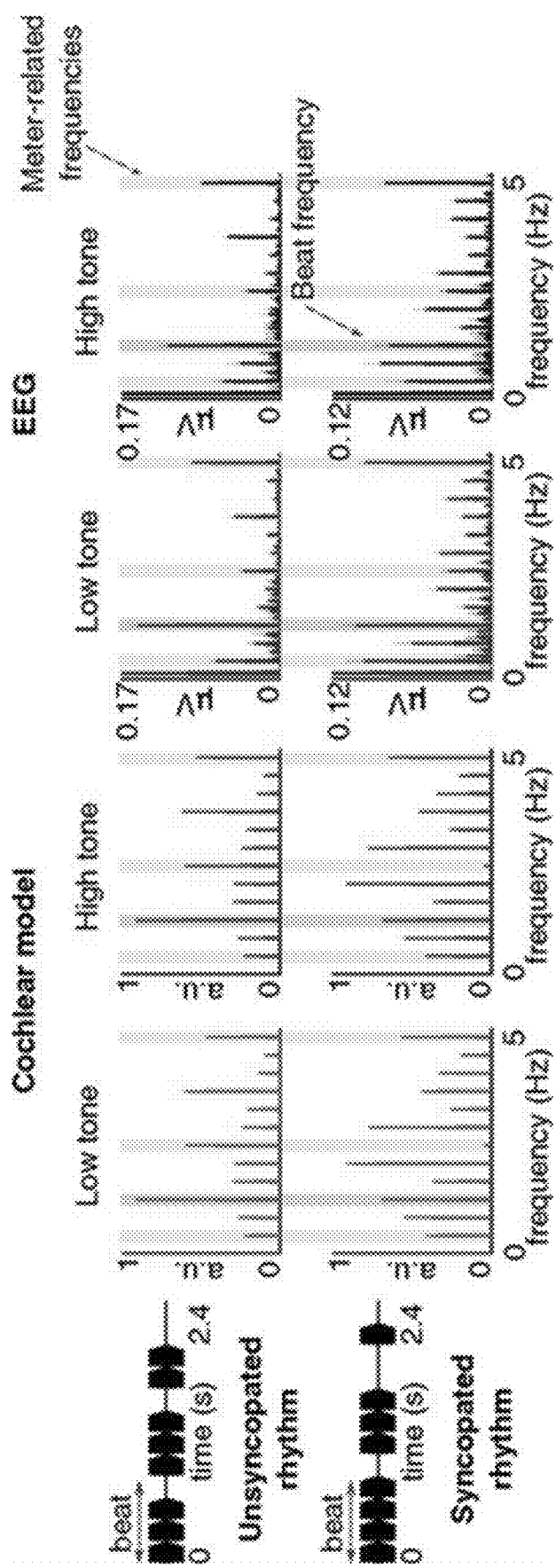
FIG. 6 illustrates an exemplary music pattern matching method, according to embodiments of the disclosure.

In step S210, the music patterns of the first and second performance videos may be matched. In some embodiments, multi composition method 100 may use the frequency and tone of the music for analyzing and matching the music patterns of the different performance videos. For example, FIG. 6 illustrates an exemplary music pattern matching method, according to embodiments of the disclosure. As shown by FIG. 6, cochlear model and electroencephalographic (EEG) may be used to perform the frequency and high/low tone analysis of the music patterns.

In some embodiments, in step S212, a scene is detected in each performance video. For example, multi composition method 100 may further perform a scene detection 140 in each performance video 110 to determine the scene in the background of the performer. For example, multiple performance videos 110 may capture the same dancer in different costumes, or different dancers, performing the dance in front of a same background. Alternatively, multiple performance videos 110 may simultaneously capture the dancer performing a dance from different view angles at the same scene.

Figure 7:
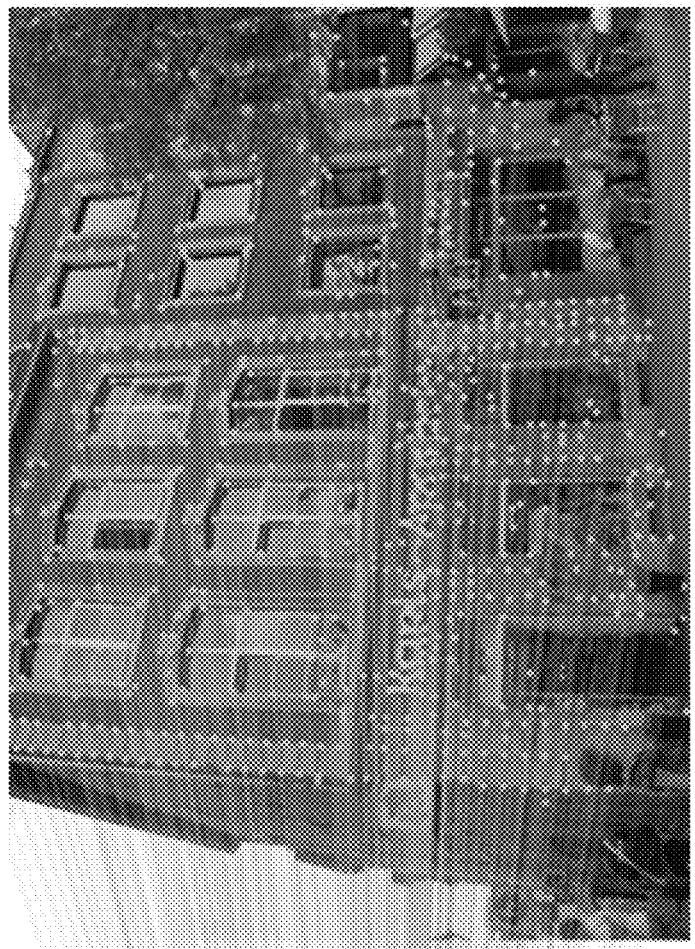
FIG. 7 illustrates an exemplary scene matching method, according to embodiments of the disclosure.
Figure 7:

In step S214, the scenes of the first and second performance videos are matched. In some embodiments, image features may be extracted from the respectively scenes, and the scenes may be matched by matching the extracted image features. For example, FIG. 7 illustrates an exemplary scene matching method, according to embodiments of the disclosure. The image on the left side may be a frame from the first performance video, which depicts a first scene 710, and the image on the right side may be a frame from the second performance video which depicts a second scene 720. In this example, first scene 710 and second scene 720 are highly related—they are essentially the same location captured at different view angles and distances. Therefore, by extracting and mapping the image feature characterizing the objects (e.g., buildings, storefronts, street, trees) in the first scene and second scene, a mapping between first scene 710 and second scene 720 can be established.

Returning to FIG. 2, in step S216, a point of transition for transitioning the first performance video to the second performance video can be determined, based on one or more of the information determined in steps S204-S214, including the pose distances between poses captured in the first and second performance videos, the music patterns matched between the first and second performance videos, and the matched scenes between the first and second performance videos. In some embodiments, the point of transition can be a time point (e.g., a time stamp) in a time sequence of image or audio data of a video. In some embodiments, because the image data of a video includes a sequence of image frames, the point of transition can be represented by a frame number. As shown in FIG. 1, a transition point 150 is determined based on pose information 120, music pattern 130, and/or scene detection 140. In some embodiments, transition point 150 may be represented by a time stamp T or a frame number F in the video.

In some embodiments, a score-based approach may be used. Scores are assigned to value the pose similarities (indicated by the pose distances) between frames of the two performance videos, the matching of the music patterns at different time points in the videos, and the matching of the scenes. These scores can then be concatenated to derive an overall evaluation, and the time point that is associated with the best score is determined as the point of transition. For example, the concatenation may be a weighted sum of the respective scores, where the weights are assigned according to the relative importance of the respective matching.

In some other embodiments, a machine learning model may be trained and used to intelligently determine the point of transition based on the input information from at least one of steps S206, S210, and S214. To determine an optimal point of transition, the machine learning model can be trained using a cost function that maximizes the matching of poses, music patterns, and/or scenes between the first performance video and the second performance video.

It should be noted that steps 208-214 are optionally and may be skipped based on the actual implementations. In some embodiments, point of transition can be determined based on the pose distances alone, although the music pattern matching information and scene matching information can help improve the accuracy of the transition point.

In step S218, a transition video (a third performance video) is generated by transitioning from the first performance video to the second performance video at the point of transition. In some embodiments, the transition video may be a combination of the first performance video up to the point of transition and the second performance video after the point of transition. In some embodiments, a first video frame in the first performance video and a second video frame in the second performance video may be based on the point of transition. The transition video is then generated by combining a first video segment of the first performance video that ends with the first video frame with a second video segment of the second performance video that begins with the second video segment. For example, frame #233 in the first performance video and frame #234 in the second performance video may be determined according to the point of transition. The transition video therefore is made of the content of the first performance video up to frame #233, and the content of second performance from frame #234 and forward. For example, as shown in FIG. 1, transition video 160 may be generated, which transitions from a dancer in a first outfit to the dancer in a second outfit, dancing in front of the same scene.

In step S220, the transition video may be displayed. The transition video may be shared by the user to family or friends through social media platforms, such as (Youtube™, Tiktok™ and so on). Activities involving synchronized movement can create powerful feelings of unity, and these practices can be the focus for feelings of group solidarity. On these platforms, the mass grouping of people together in space is replaced by a more subtle form of togetherness through imitation and synchronized movement. The performers are separated through time and space, but they create solidarity and positive feeling by moving together, mediated by the structure of the platform.

Figure 8:
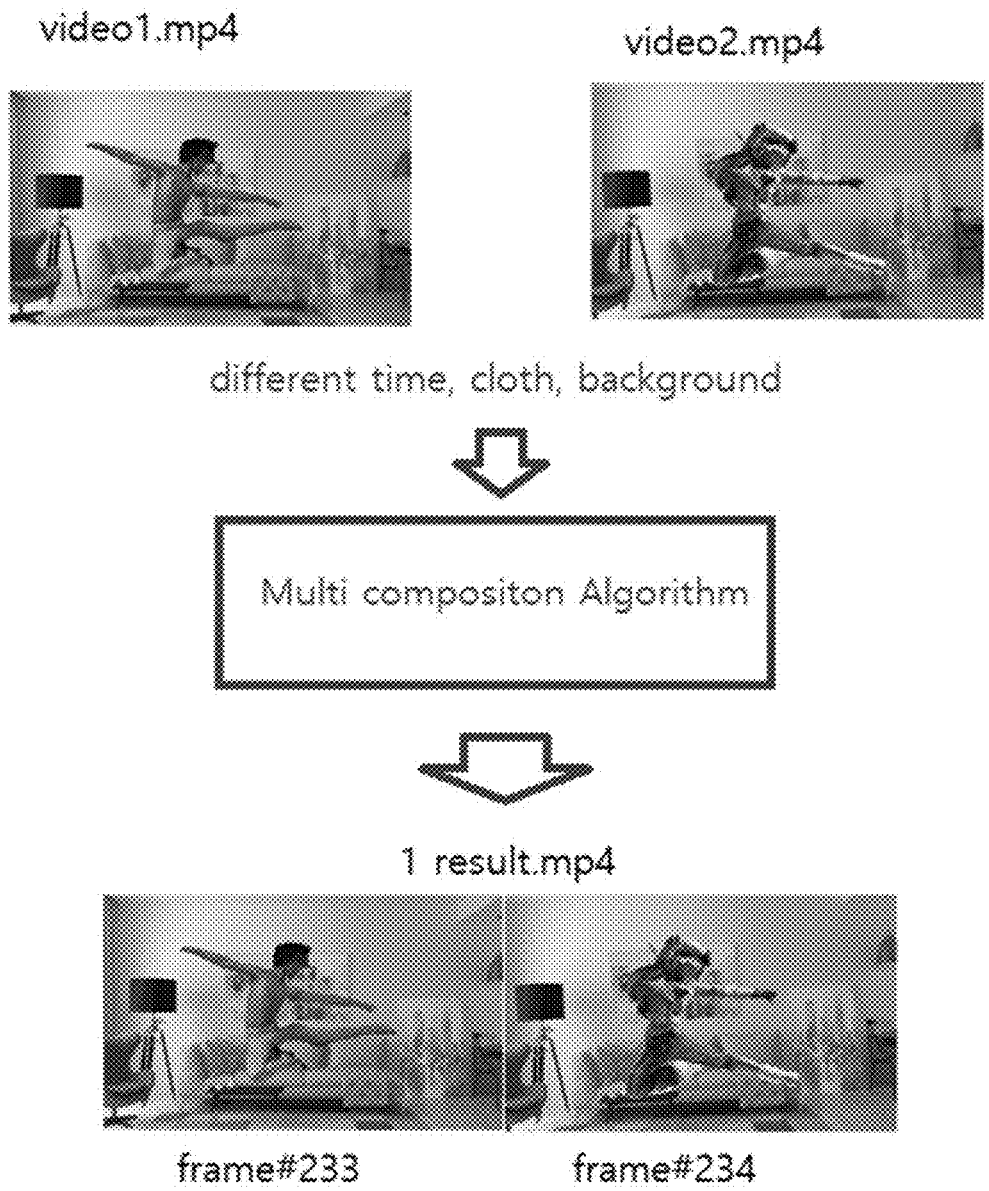
FIG. 8 is a schematic diagram illustrating an exemplary multi-dance transition between two dance videos, according to embodiments of the disclosure.
Figure 9:
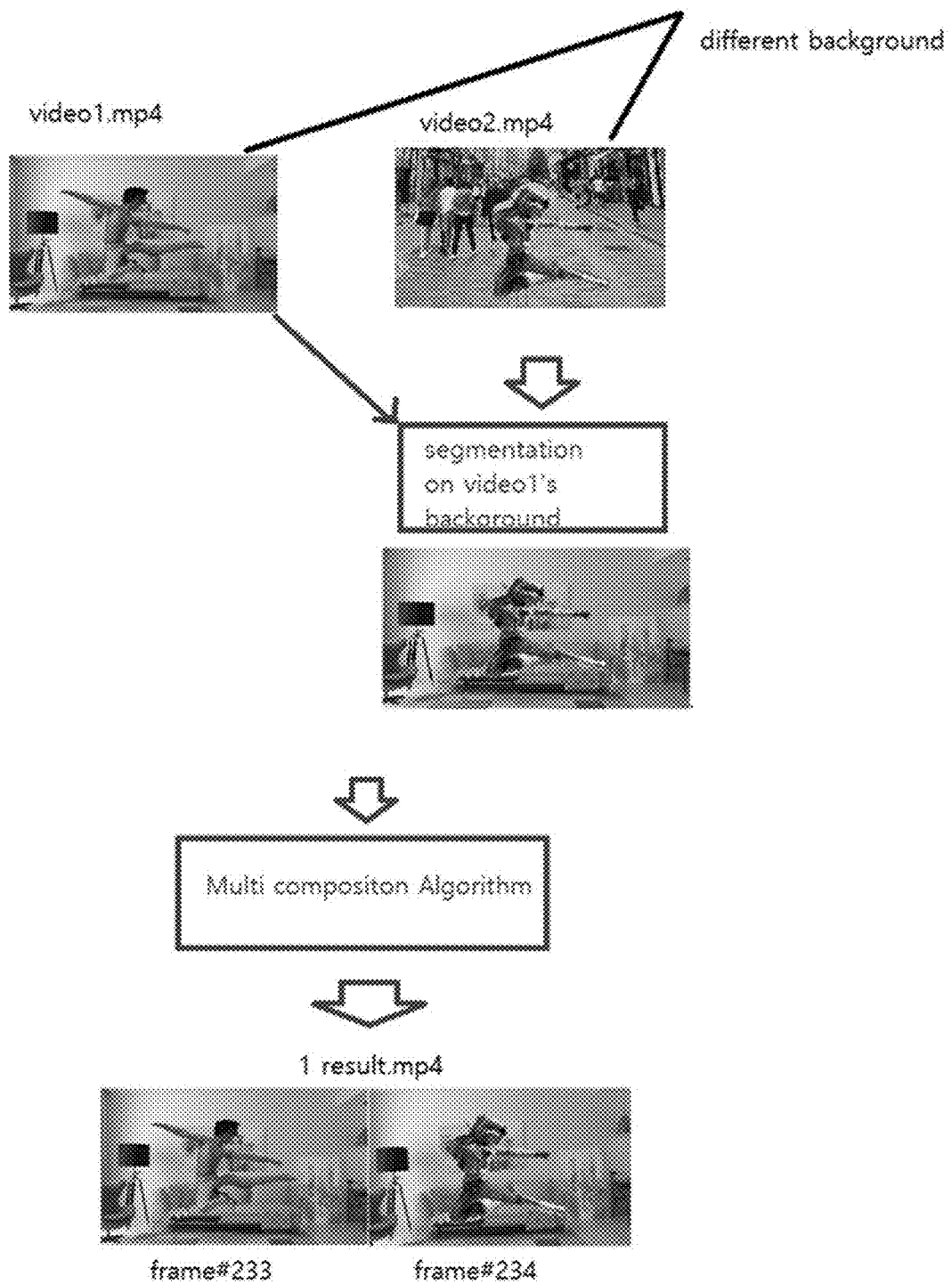
FIG. 9 is a schematic diagram illustrating an exemplary multi-dance transition between two dance videos with different backgrounds, according to embodiments of the disclosure.
Figure 10:
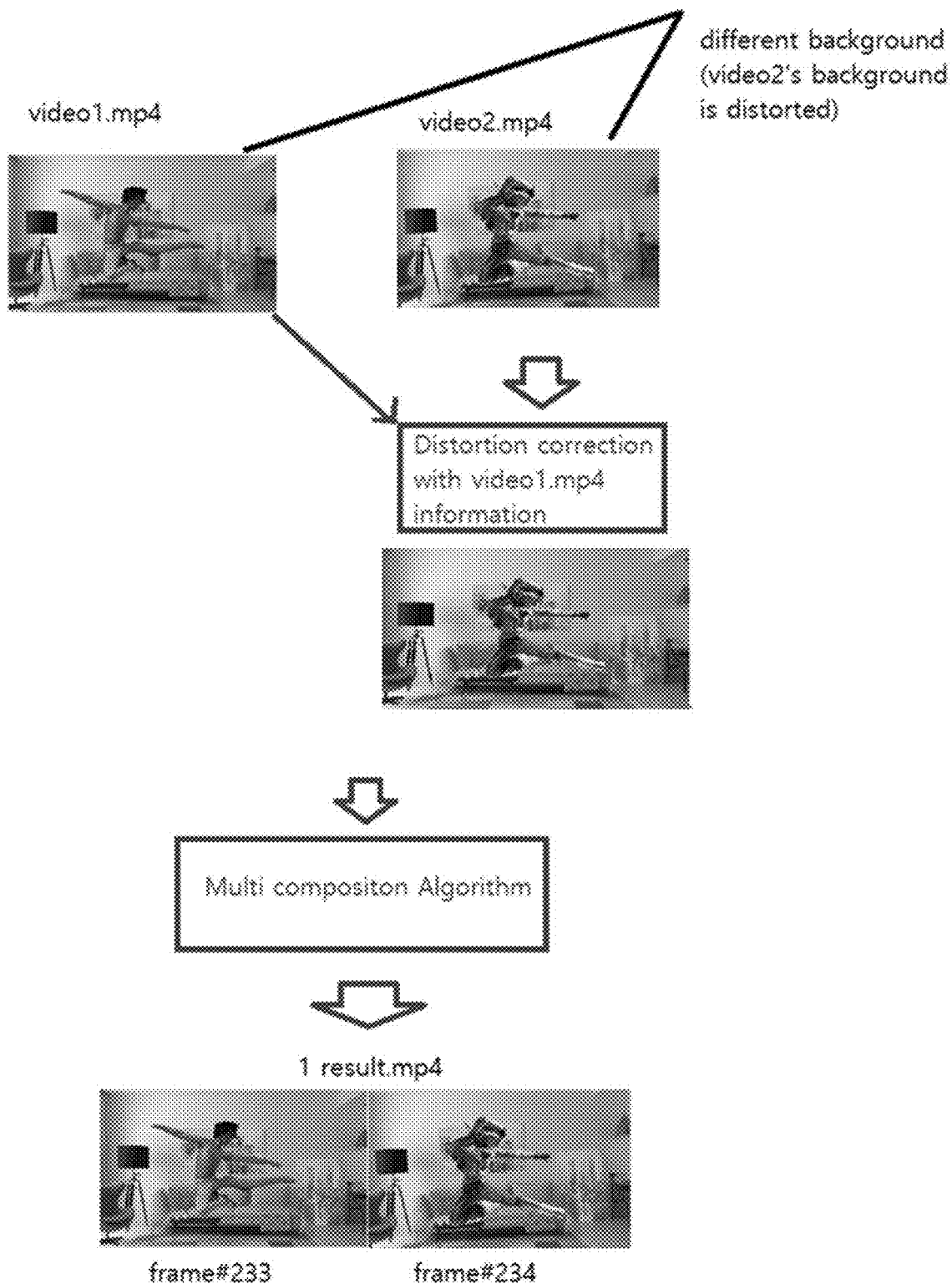
FIG. 10 is a schematic diagram illustrating an exemplary multi-dance transition between two dance videos where one video has a distorted background, according to embodiments of the disclosure.

Multi composition method 100 and method 200 illustrated by FIG. 1 and FIG. 2 and described above can be applied to generating transition videos in various scenarios, e.g., as shown in FIG. 8-FIG. 10.

FIG. 8 is a schematic diagram illustrating an exemplary multi-dance transition between two dance videos, according to embodiments of the disclosure. As shown in FIG. 8, two dance videos are received, video1.mp4 and video2.mp4, for creating a dance cover. Video1.mp4 captures a dancer performing a dance in a first outfit in a living room scene. Video2.mp4 captures the dancer or a different dancer in a second outfit performing the dance in the same scene. Methods 100 and 200 can be applied to video1.mp4 and video2.mp4 to create a transition video "1 result.mp4". In this example, frame #233 is determined as the point of transition. The transition video therefore is made of the content of video1.mp4 up to frame #233, and the content of video2.mp4 from frame #234 and forward.

FIG. 9 is a schematic diagram illustrating an exemplary multi-dance transition between two dance videos with different backgrounds, according to embodiments of the disclosure. This example is similar to that of FIG. 8, except the two dance videos, video1.mp4 and video2.mp4, received for creating a dance cover have different backgrounds (i.e., taken at different scenes). As shown in FIG. 9, video1.mp4 captures a dancer performing a dance in a first outfit in a living room. Video2.mp4 captures the dancer or a different dancer performing the same dance in a second outfit on a street. In this scenario, the first performance video and the second performance video may be matched to a same background before applying the multi composition method to generate the transition video. To do that, image segmentation may be applied to a selected one of the two videos, e.g., video1.mp4, to obtain the background. Various existing segmentation techniques may be used to provide a segmentation mask. Background warp is then applied to warp the segmented background to the other video, e.g., video2.mp4 to change its background to the match the background of video1.mp4. After the background of video2.mp4 is changed to match the background of video1.mp4, similar steps may be performed to the two videos as those described above in connection with FIG. 8.

FIG. 10 is a schematic diagram illustrating an exemplary multi-dance transition between two dance videos where one video has a distorted background, according to embodiments of the disclosure. This example is similar to that of FIG. 8, except that one of the two dance videos, video1.mp4 and video2.mp4, received for creating a dance cover has a distorted background. As shown in FIG. 10, video2.mp4 has a distorted background. In this scenario, the distortion in the background may be corrected before applying the multi composition method to generate the transition video. To do that, the video that has a non-distorted background, e.g., video1.mp4 in this example, can be used to correct the distorted background in the other video, e.g., video2.mp4. Various existing distortion correction techniques may be used. For example, the background of video2.mp4 may be rotated, translated, or otherwise transformed to match the background of video1.mp4. After the distortion in the background of video2.mp4 is corrected to match the background of video1.mp4, similar steps may be performed to the two videos as those described above in connection with FIG. 8.

Figure 11:
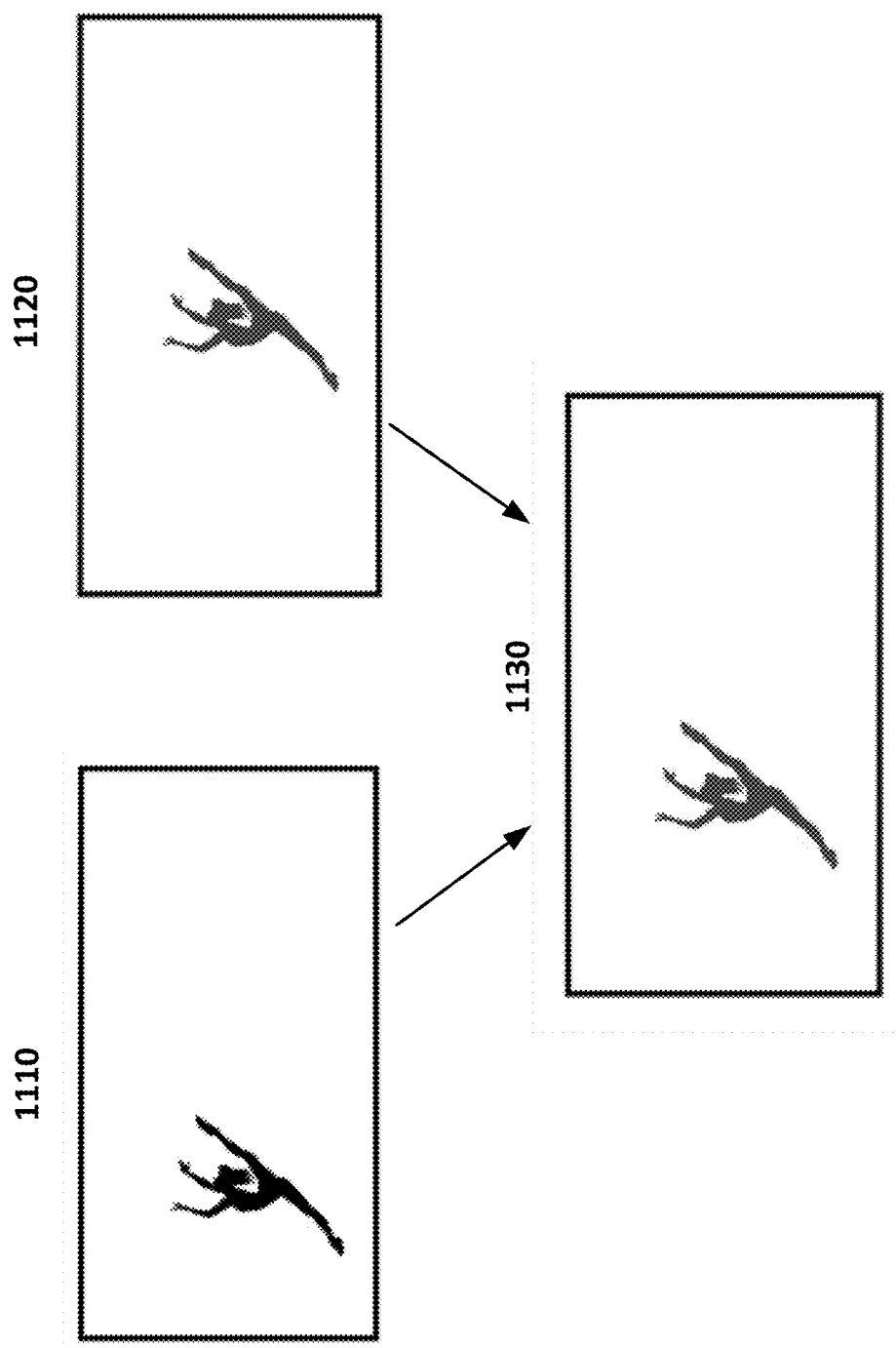
FIG. 11 is a schematic diagram illustrating an exemplary process of matching a performer captured in different videos to a same location, according to embodiments of the disclosure.

In some scenarios, the dancers captured in the two dance videos may be located in different locations of the screen. In that case, the two dancers may be matched to same location of screen by cropping or warping to make smoothly transition. For example, FIG. 11 is a schematic diagram illustrating an exemplary process of matching a performer captured in different videos to a same location, according to embodiments of the disclosure. As shown in FIG. 11, the first dancer is located to the left of the screen in a first performance video 1110, while the second dancer is located around the center of the screen in a second performance video 1120. The dancers may be cropped or warped to a location between the original locations, such as a middle point between the two. As a result, in a transition video 1130 generated using first performance video 1110 and second performance video 1120, the transition may look smooth with the dancer always remain in the adjusted location.

Figure 12:
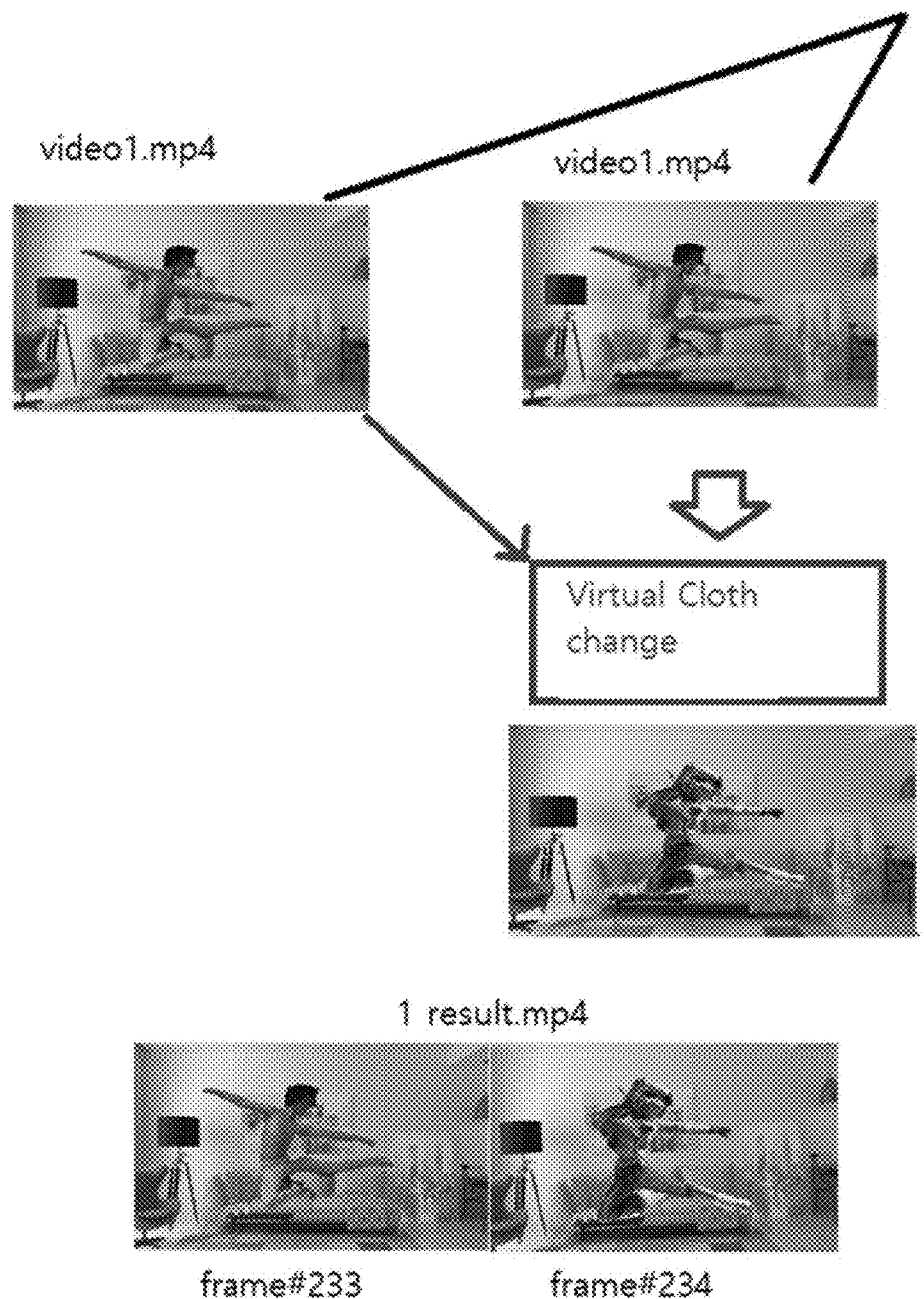
FIG. 12 is a schematic diagram illustrating an exemplary multi-dance transition with a virtual cloth change, according to embodiments of the disclosure.

In some scenarios, the second performance video may be created by applying a virtual cloth change to the first performance video. For example, FIG. 12 is a schematic diagram illustrating an exemplary multi-dance transition with a virtual cloth change, according to embodiments of the disclosure. In this example, a first performance video, e.g., video1.mp4, is received and a second performance video is created on a copy of the first performance video by warping virtual cloth to the performer therein. After creating the second performance video with virtual cloth change, similar steps may be performed to the two videos as those described above in connection with FIG. 8. It is contemplated that the same method can be similarly implemented in a scenario where two different videos are received, such as video1.mp4 and video2.mp4 in the example of FIG. 8. In that case, virtual cloth changed can be applied to either or both of the videos, and the multi composition method can be applied to the modified videos after virtual cloth change.

Figure 13:
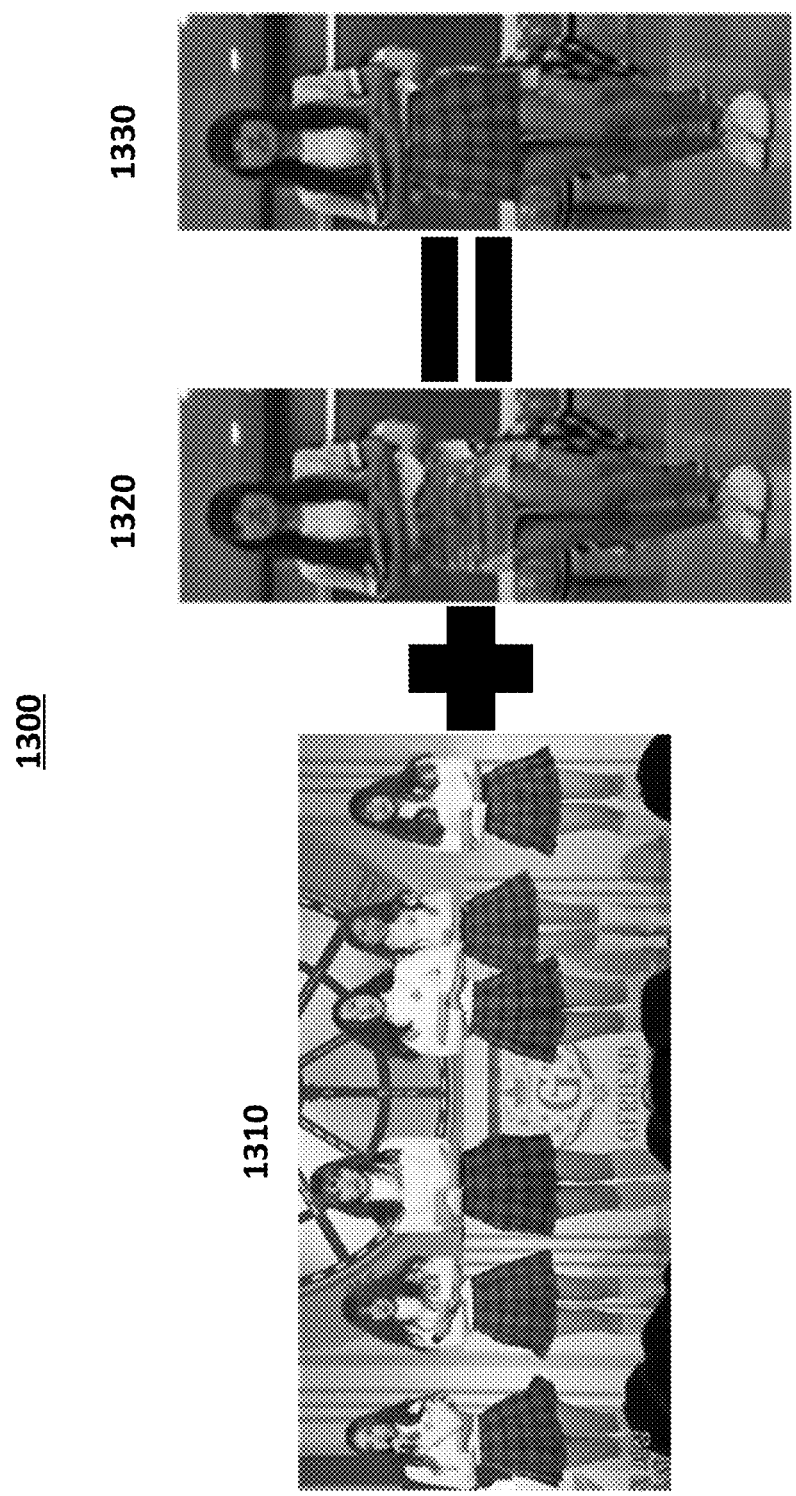
FIG. 13 is a schematic diagram illustrating an exemplary virtual cloth change method for warping a virtual cloth cropped from a reference video to a target video, according to embodiments of the disclosure.

Consistent with the present disclosure, virtual cloth can be either obtained from an existing video, such as an idol performance video, or created on a template model, before warping to the target video. For example, FIG. 13 is a schematic diagram illustrating an exemplary virtual cloth change method 1300 for warping a virtual cloth cropped from a reference video to a target video, according to embodiments of the disclosure. As shown in FIG. 13, virtual cloth can be obtained from a reference performance video 1310 (e.g., an idol performance video). For example, image segmentation techniques can be applied to crop the cloth worn by the idol performer in the idol performance video. The virtual cloth can be then warped to target performance video 1320 (e.g., a user's performance video). Reference performance video 1310 and target performance video 1320 may be automatically linked at the same time of motion, and the virtual cloth cropped from each frame in reference performance video 1310 is warped to the temporally linked frame in target performance video 1320. With the virtual cloth change, target performance video 1320 is modified to be a new video 1330, where the performer wears the virtual cloth.

Figure 14:
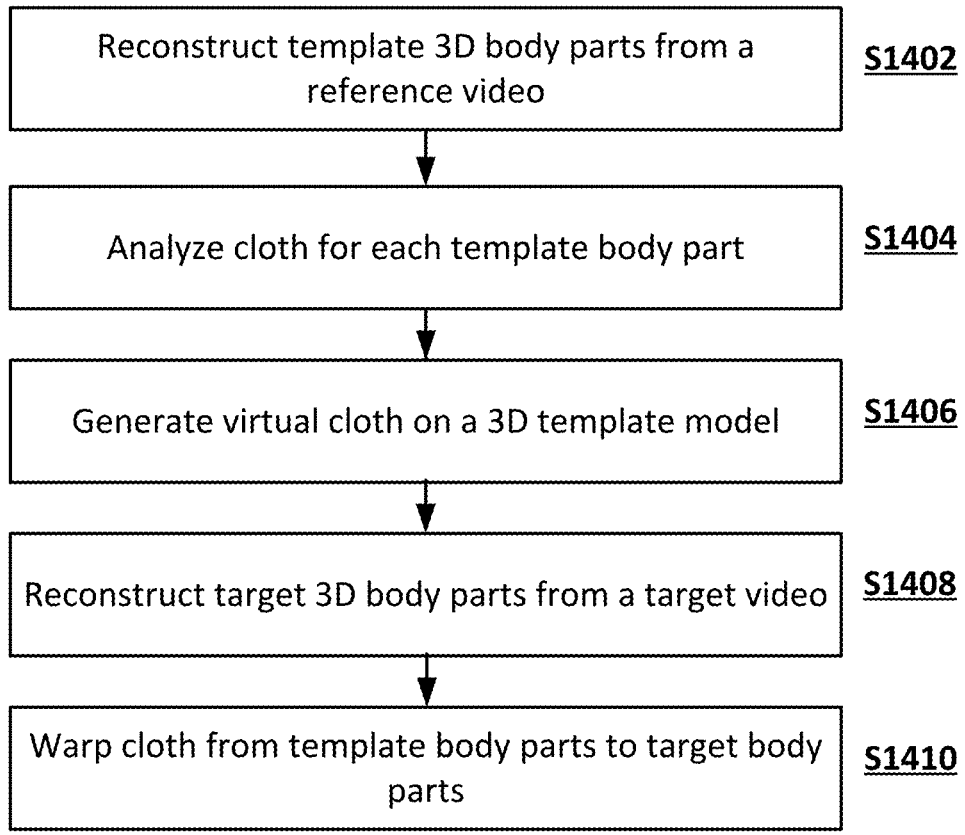
FIG. 14 is a flowchart of an exemplary method for warping virtual cloth generated for a template model to a target video, according to embodiments of the disclosure.

As another example, FIG. 14 is a flowchart of an exemplary method 1400 for warping a virtual cloth generated for a template model to a target video, according to embodiments of the disclosure. Method 1400 may include steps S1402-S1410 as described below. It is to be appreciated that some of the steps may be optional to perform the disclosure provided herein. Further, some of the steps may be performed simultaneously, or in a different order than shown in FIG. 14.

In step S1402, 3D template body parts of a person are reconstructed from a reference video. In some embodiments, existing reconstruction methods, such as bodynet, can be used for volumetric inference of 3D human body shapes.

In step S1404, cloth can be analyzed for each template body part. In some embodiments, cloth of each template body part can be created by per-pixel copy from the corresponding body part in the reference video. The cloth of each template body part is then analyzed by using pre-defined cloth or pattern dictionary.

In step S1406, virtual cloth is generated on a 3D template model. The template model is composed of the 3D template body parts reconstructed in step S1402, and the virtue cloth includes the cloth pieces created for these respective 3D template body parts in step S1404.

In step S1408, target 3D body parts are reconstructed from the target video, e.g., the first performance video or the second performance video described in connection with FIG. 2. Reconstruction of target 3D body parts from the target video is similar to the reconstruction of 3D template body parts from the reference video, as described in step S1402.

In step S1410, the virtual cloth of the template body parts on the templated model are warped to the respective target body parts in the target video. Accordingly, virtual cloth is applied to the target video.

Figure 15:
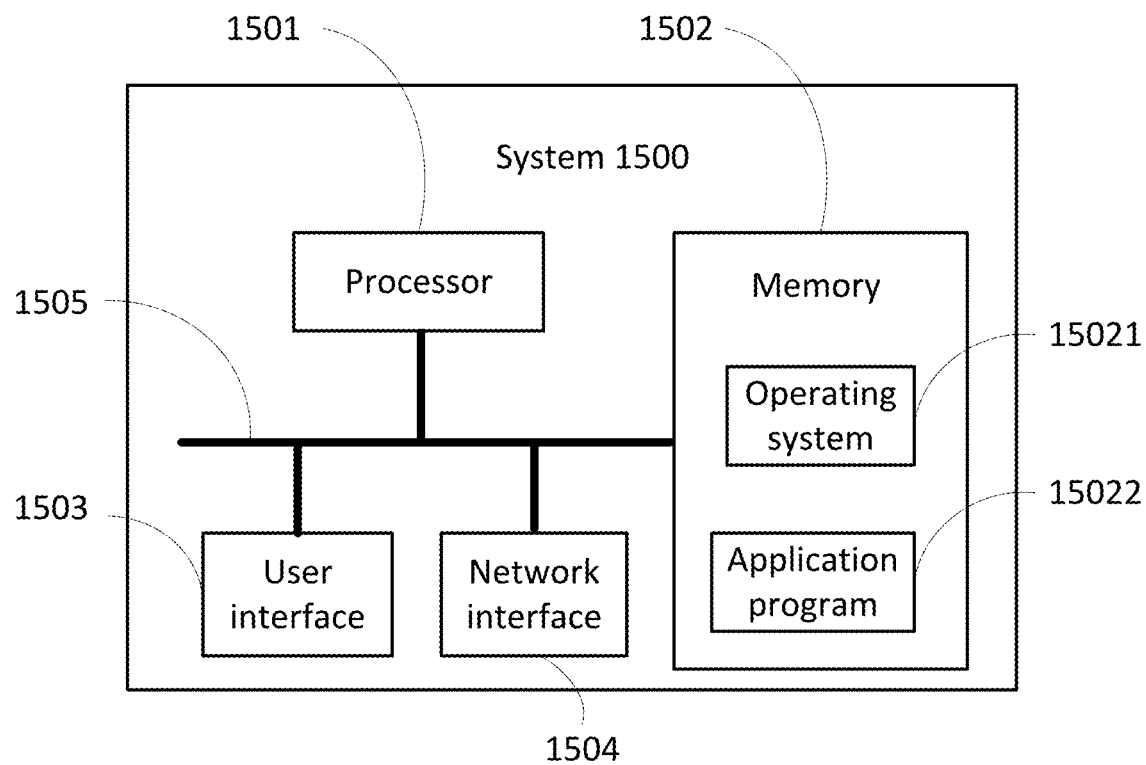
FIG. 15 is a block diagram of an exemplary system for generating a transition video from multiple performance videos, according to embodiments of the disclosure.

FIG. 15 is a block diagram of an exemplary system 1500 for generating a transition video from multiple performance videos, according to embodiments of the disclosure. In some embodiments, system 1500 may be implemented by a physical server or a service in the cloud. In some other embodiments, system 1500 may be implemented by a computer or a consumer electronic device such as a mobile phone, a pad, or a wearable device. In yet some other embodiments, system 1500 may be implemented by multiple devices or multiple processors of the same device.

As shown in FIG. 15, system 1500 may includes at least one processor 1501, a memory 1502, a user interface 1503, a network interface 1504, and a bus 1505. In some embodiments, system 1500 may have different modules in a single device, such as an integrated circuit (IC) chip (implemented as an application-specific integrated circuit (ASIC) or a field-programmable gate array (FPGA)), or separate devices with dedicated functions. Components of system 1500 may be in an integrated device, or distributed at different locations but communicate with each other through a network (not shown).

Each processor 1501 may be an integrated circuit chip having a signal processing capability. During implementation, each step of the foregoing method may be completed by using an integrated logic circuit of hardware in processor 1501 or an instruction in a form of software. Processor 1501 may be a general-purpose processor, a Digital Signal Processor (DSP), an Application Specific Integrated Circuit (ASIC), a Field Programmable Gate Array (FPGA) or other programmable logic devices, a discrete gate or a transistor logic device, and a discrete hardware assembly. Processor 1501 may implement or perform the methods, the steps, and logical block diagrams that are disclosed in the embodiments of this application. The general-purpose processor may be a microprocessor, or the processor may be any conventional processor or the like.

Memory 1502 may be a volatile memory or a nonvolatile memory, or may include both a volatile memory and a nonvolatile memory. The non-volatile memory is a Read-Only Memory (ROM), a Programmable ROM (PROM), an Erasable PROM (EPROM), an Electrically EPROM (EEPROM) or a flash memory. The volatile memory may be a Random Access Memory (RAM), used as an external cache. Through example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM), and a Direct Rambus RAM (DRRAM).

In some embodiments, memory 1502 stores an executable module or a data structure, or a subset thereof, or an extension set including an operating system 15021 and an application program 15022. Operating system 15021 includes various system programs, for example, a framework layer, a kernel library layer, and a driver layer, and is configured to implement various basic services and process hardware-based tasks. Application program 15022 includes various application programs, for example, a media player, and a browser, and is configured to implement various application services. One or more programs for implementing the methods described above in this disclosure may be included in application program 15022.

In some embodiments, system 1500 further includes one or more computer program that are stored in the memory 1502 and that can be run on the processor 1501, and the computer programs, when is executed by the processor 1501, perform one or more methods described above, including, e.g., methods 100 and 200. The methods may be directly performed through a hardware decoding processor, or may be executed and accomplished by using a combination of hardware and software modules in the decoding processor.

User interface 1503 may include a display, a keyboard, a clicking device (for example, a mouse, a trackball), a touch panel, or a touchscreen. In some embodiments, user interface 1503 may be configured to receive user input. The display may include a number of different types of materials, such as plastic or glass, and may be touch-sensitive to receive commands from the user. For example, the display may include a touch-sensitive material that is substantially rigid, such as Gorilla Glass™, or substantially pliable, such as Willow Glass™. User interface 1503 may provide a Graphical User Interface (GUI) for user input and data display. For example, the user may interact with the various videos through user interface 1503. In some embodiments, user interface 1503 may also function as a display to display the performance videos described in this disclosure to a user. For example, user interface 1503 may include a Liquid Crystal Display (LCD), a Light Emitting Diode Display (LED), a plasma display, or any other type of display.

Network interface 1504 may receive and send data via direct communication links, a Wireless Local Area Network (WLAN), a Wide Area Network (WAN), wireless communication networks using radio waves, a cellular network, and/or a local wireless network (e.g., Bluetooth™ or WiFi), or other communication methods. In some embodiments, network interface 1504 can be an integrated services digital network (ISDN) card, cable modem, satellite modem, or a modem to provide a data communication connection. As another example, network interface 1504 can be a local area network (LAN) card to provide a data communication connection to a compatible LAN. Wireless links can also be implemented by network interface 1504. In such an implementation, network interface 1504 can send and receive electrical, electromagnetic or optical signals that carry digital data streams representing various types of information via a network.

The various components of system 1500 may be connected to and communicate with each other through bus 1505. Bus 1505 is configured to implement connection and communication between these components. In some embodiments, in addition to a data bus, bus 1505 may further include a power bus, a control bus, and a status signal bus. These various buses are not specifically shown in FIG. 15, but instead shown collectively as bus 1505 in FIG. 15.

Another aspect of the disclosure is directed to a non-transitory computer-readable medium storing instruction which, when executed, cause one or more processors to perform the methods, as discussed above. The computer-readable storage medium may be part of memory 1502. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be apparent to those skilled in the art that various modifications and variations can be made to the disclosed system and related methods. Other embodiments will be apparent to those skilled in the art from consideration of the specification and practice of the disclosed system and related methods.

It is intended that the specification and examples be considered as exemplary only, with a true scope being indicated by the following claims and their equivalents.

The invention claimed is:

1. A video processing method, comprising:
receiving a first performance video and a second performance video;
estimating, by at least one processor, pose information in each of the first performance video and the second performance video;
determining a music pattern in each of the first performance video and the second performance video based on audio data in the corresponding performance video;
determining, by the at least one processor, a point of transition from the first performance video to the second performance video based on a pose distance calculated using the estimated pose information and by matching music patterns of the first performance video and the second performance video; and
generating, by the at least one processor, a third performance video by transitioning the first performance video to the second performance video at the point of transition.

2. The video processing method of claim 1, further comprising:
detecting a scene in each of the first performance video and the second performance video; and
determining the point of transition additionally based on matching the scenes in the first and second performance videos.

3. The video processing method of claim 1, wherein generating the third performance video further comprises:
identifying a first video frame in the first performance video and a second video frame in the second performance video based on the point of transition; and
generating the third performance video by combining a first video segment of the first performance video with a second video segment of the second performance video, wherein the first video frame is the end video frame of the first video segment and the second video frame is the beginning video frame of the second video segment.

4. The video processing method of claim 1, wherein calculating the pose distance using the estimated pose information comprises:
selecting, for a first pose captured by the first performance video, a first reference pose from a pose dictionary comprising a plurality of reference poses;
selecting, for a second pose captured by the first performance video, a second reference pose from the pose dictionary; and
calculating the pose distance between the first pose and the second pose based on a pre-calculated distance between the first reference pose and the second reference pose.

5. The video processing method of claim 4, wherein selecting the first reference pose from the pose dictionary for the first pose comprises:
determining a similarity between the first pose and each reference pose in the pose dictionary, based on scores determined for a plurality of body parts in the first pose; and
selecting a reference pose among the plurality of references poses in the pose dictionary that has the highest similarity with the first pose as the first reference pose.

6. The video processing method of claim 1, further comprising:
matching the first performance video and the second performance video to a same background; or
matching at least one performer to a same location in the first performance video and the second performance video.

7. The video processing method of claim 1, further comprising:
performing a virtual cloth change to the at least one performer in the first performance video, the second performance video, or the third performance video.

8. The video processing method of claim 7, wherein performing a virtual cloth change to the at least one performer in the first performance video, the second performance video, or the third performance video further comprises:
    temporally linking a reference performance video with the first performance video, the second performance videos, or the third performance video;
    extracting virtual cloth from the reference performance video; and
    warping the virtual cloth to the at least one performer in the first performance video or the second performance video.

9. The video processing method of claim 8, wherein performing a virtual cloth change to the at least one performer in the first performance video, the second performance video, or the third performance video further comprises:
    creating virtual cloth on a three-dimensional template model comprising a plurality of template body parts;
    reconstructing a plurality of target body parts of the at least one performer in the first performance video or the second performance video; and
    warping the virtual cloth from the template body parts to the respective target body parts.

10. A video processing system, comprising:
    a storage device configured to receive a first performance video and a second performance video; and
    at least one processor configured to:
        estimate pose information in each of the first performance video and the second performance video;
        determining a music pattern in each of the first performance video and the second performance video based on audio data in the corresponding performance video;
        determine a point of transition from the first performance video to the second performance video based on a pose distance calculated using the estimated pose information and by matching music patterns of the first performance video and the second performance video; and
        generate a third performance video by transitioning the first performance video to the second performance video at the point of transition.

11. The video processing system of claim 10, wherein the at least one processor is further configured to:
    detect a scene in each of the first performance video and the second performance video; and
    determine the point of transition additionally based on matching the scenes in the first and second performance videos.

12. The video processing system of claim 10, wherein to generate the third performance video, the at least one processor is further configured to:
    identify a first video frame in the first performance video and a second video frame in the second performance video based on the point of transition; and
    generate the third performance video by combining a first video segment of the first performance video with a second video segment of the second performance video, wherein the first video frame is the end video frame of the first video segment and the second video frame is the beginning video frame of the second video segment.

13. The video processing system of claim 10, wherein to calculate the pose distance using the estimated pose information, the at least one processor is further configured to:
    select, for a first pose captured by the first performance video, a first reference pose from a pose dictionary comprising a plurality of reference poses;
    select, for a second pose captured by the first performance video, a second reference pose from the pose dictionary; and
    calculate the pose distance between the first pose and the second pose based on a pre-calculated distance between the first reference pose and the second reference pose.

14. The video processing system of claim 13, wherein to select the first reference pose from the pose dictionary for the first pose, the at least one processor is further configured to:
    determine a similarity between the first pose and each reference pose in the pose dictionary, based on scores determined for a plurality of body parts in the first pose; and
    select a reference pose among the plurality of references poses in the pose dictionary that has the highest similarity with the first pose as the first reference pose.

15. The video processing system of claim 10, wherein the at least one processor is further configured to:
    match the first performance video and the second performance video to a same background; or
    match the at least one performer to a same location in the first performance video and the second performance video.

16. The video processing system of claim 10, wherein the at least one processor is further configured to:
    perform a virtual cloth change to at least one performer in the first performance video, the second performance video, or the third performance video.

17. The video processing system of claim 16, wherein to perform a virtual cloth change to the at least one performer in the first performance video, the second performance video, or the third performance video further comprises:
    temporally link a reference performance video with the first performance video, the second performance videos, or the third performance video;
    extract virtual cloth from the reference performance video; and
    warp the virtual cloth to the at least one performer in the first performance video or the second performance video.

18. A non-transitory computer-readable medium having a computer program stored thereon, wherein the computer program, when executed by at least one processor, causes the at least one processor to perform a video processing method, comprising:
    receiving a first performance video and a second performance video;
    estimating pose information in each of the first performance video and the second performance video;
    determining a music pattern in each of the first performance video and the second performance video based on audio data in the corresponding performance video;
    determining a point of transition from the first performance video to the second performance video based on a pose distance calculated using the estimated pose information and by matching music patterns of the first performance video and the second performance video; and
    generating a third performance video by transitioning the first performance video to the second performance video at the point of transition.

* * * * *